(12) United States Patent
Sprenger et al.

(10) Patent No.: US 9,722,699 B2
(45) Date of Patent: Aug. 1, 2017

(54) SYSTEMS AND METHODS FOR MANAGING POWER AT AN OPTICAL NETWORK TERMINAL

(71) Applicant: Cable Television Laboratories, Inc., Louisville, CO (US)

(72) Inventors: Michael Sprenger, Louisville, CO (US); Lane Johnson, Louisville, CO (US); Curtis Knittle, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/947,758

(22) Filed: Nov. 20, 2015

(65) Prior Publication Data

US 2016/0182150 A1 Jun. 23, 2016

Related U.S. Application Data

(60) Provisional application No. 62/082,453, filed on Nov. 20, 2014.

(51) Int. Cl.
*H04B 10/80* (2013.01)
*H04B 10/079* (2013.01)
*H04B 10/032* (2013.01)
*H04B 10/272* (2013.01)

(52) U.S. Cl.
CPC ..... *H04B 10/07955* (2013.01); *H04B 10/032* (2013.01); *H04B 10/0793* (2013.01); *H04B 10/272* (2013.01); *H04B 10/807* (2013.01)

(58) Field of Classification Search
CPC .......... H04B 10/0793; H04B 10/07955; H04B 10/807; H04B 10/032
See application file for complete search history.

(56) References Cited

U.S. PATENT DOCUMENTS

| | | | | |
|---|---|---|---|---|
| 2002/0027510 A1* | 3/2002 | Jones | ..................... | G08G 1/095 340/907 |
| 2006/0029389 A1* | 2/2006 | Cleary | ................. | H04B 10/806 398/33 |
| 2008/0195881 A1* | 8/2008 | Bernard | ............... | G06Q 20/102 713/340 |
| 2015/0100166 A1* | 4/2015 | Baynes | ................ | F24F 11/0009 700/278 |
| 2016/0164687 A1* | 6/2016 | Cooper | ................... | H04L 12/10 307/1 |

* cited by examiner

*Primary Examiner* — Dzung Tran
(74) *Attorney, Agent, or Firm* — Duft Bornsen & Fettig LLP; Gregory T. Fettig (57) ABSTRACT

Systems and methods presented herein provide for operating an optical network terminal (ONT) during a power outage. In one embodiment, an ONT includes an opto-electrical converter operable to receive an optical signal and to convert the optical signal to a data signal, and a data processing module operable to process data from the data signal. The ONT also includes a power management unit operable to detect a power outage of a power supply, to initiate a low power mode, to terminate a portion of data processing by the data processing module based on the low power mode, to convert the optical signal to electrical power, and to maintain operation of the low power mode utilizing the electrical power. The power management unit is further operable to monitor the power supply for restoration of power, and to reinitialize the data processing module upon restoration of power.

20 Claims, 6 Drawing Sheets

SYSTEMS AND METHODS FOR MANAGING POWER AT AN OPTICAL NETWORK TERMINAL

CROSS REFERENCE TO RELATED APPLICATIONS

This patent application claims priority to, and thus the benefit of an earlier filing data from, U.S. Provisional Patent Application No. 62/082,453 (filed Nov. 20, 2014), the entire contents of which are incorporated by reference.

FIELD OF THE INVENTION

The invention relates to optical network terminals in an optical communication network.

BACKGROUND

Power outages cripple the communication capabilities of optical communication systems, such as Fiber-To-The-Home (FTTH), passive optical network (PON), RF over Glass (RFoG), and dedicated fiber access architectures including Active Ethernet (AE). More specifically, power outage have a crippling effect on the communications of the optical units of these systems, such as optical network terminals (ONTs) and optical network units (ONUs). Accordingly, these units are often equipped with external rechargeable backup batteries that provide power in case of power failures. For example, when power fails at an end user's location, an ONT can still provide certain services such as telephony and WiFi using the stored energy of the backup battery.

Typically, a backup battery can provide sufficient power to an ONT for approximately four to eight hours. Afterwards, the ONT ceases to function. From a network operator's perspective, it is desirable to obtain information about the ONT's status prior to the power outage. Status information can be maintained in non-volatile memory on the ONT (e.g., flash Random Access Memory or "RAM", solid state devices or "SSDs") but it is not available until the power is restored because communications with the ONT cannot be established until then. This status information (e.g., network status, transient faults, power blackouts and brownouts, etc.) can be very useful to the network operator when quickly trying to diagnose a problem.

SUMMARY

Systems and methods presented herein provide for operating an optical network terminal (ONT) during a power outage. In one embodiment, an ONT includes an opto-electrical converter operable to receive an optical signal and to convert the optical signal to a data signal, and a data processing module operable to process data from the data signal. The ONT also includes a power management unit operable to detect a power outage of a power supply, to initiate a low power mode, to terminate a portion of data processing by the data processing module based on the low power mode, to convert the optical signal to electrical power, and to maintain operation of the low power mode utilizing the electrical power. The power management unit is further operable to monitor the power supply for restoration of power, and to reinitialize the data processing module upon restoration of power.

The various embodiments disclosed herein may be implemented in a variety of ways as a matter of design choice. For example, the embodiments may take the form of physical machines, computer hardware, software, firmware, or combinations thereof. In one embodiment, a computer readable medium is operable to store software instructions for directing the asset insertion into content. These software instructions are configured so as to direct a processor or some other processing system to operate in the manner described above. Other exemplary embodiments are described below.

BRIEF DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION OF THE DRAWINGS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below.

Figure 1:
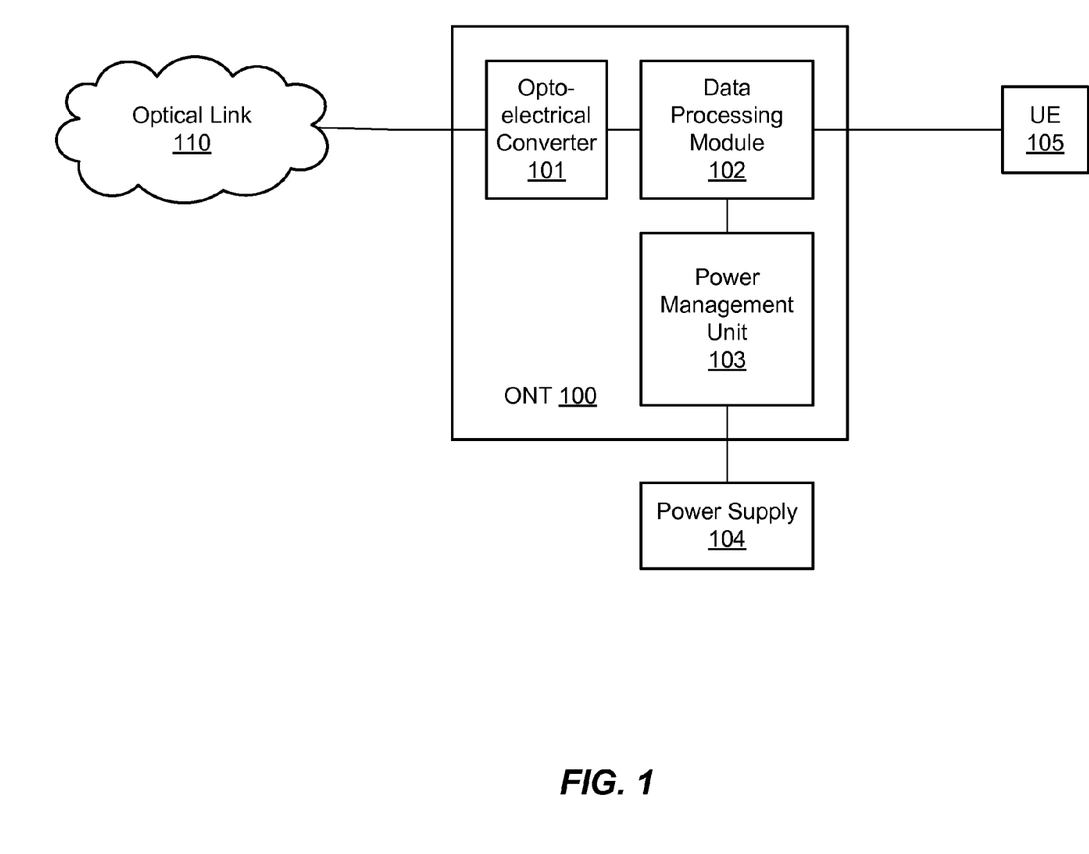
FIG. 1 is a block diagram of an exemplary ONT.

FIG. 1 is a block diagram of an exemplary ONT 100. The ONT 100 is any device, system, software, or combination thereof operable to interface with an optical link 110 and communicate through the optical link 110. For example, the optical link 110 may be representative of an optical network with other users also having ONTs. The ONT 100 communicates through the optical link 110 using optical communication techniques (e.g., lasers, fiber optics, etc.) to communicate with the other ONTs. In this regard, the ONT 100 has an opto-electrical converter 101 that is operable to convert a received optical data signal to an electrical data signal (e.g., a digital signal) that can be processed by a data processing module 102 of the ONT 100. The data signal is then transferred to the UE 105 for consumption by the UE 105 and/or the end user of the UE 105 (e.g., telephony services, video services, audio services, data services, network status information, diagnostic information, etc.).

Generally, the ONT 100 is also configured with an opto-electrical transmitter that can convert an electrical signal from the ONT 100 to an optical signal for transmission to one or more the other ONTs through the optical link 110. For the purposes of simplicity in this exemplary embodiment, the opto-electrical transmitter is not shown.

The ONT 100 also includes a power management unit 103 that is operable to supply power from the power supply 104 to the various components of the ONT 100. Generally, the data processing module 102 and the power management unit 103 are controlled by a computer processor or other processing system resident with the ONT 100. For example, the ONT 100 may be configured with an end user's residence to supply data and other services to the UE 105 within the user's residence. As such, the ONT 100 would generally be configured as a self-contained device comprising hardware and software that is operable to process data from the optical link 110 and consume that data for certain purposes (e.g., diagnostics, status, protocol establishment, etc.) and/or deliver the data and other services to the UE 105.

In addition to supplying power from the power supply 104 to the ONT 100, the power management unit 103 is operable to detect when a power outage occurs on the power supply 104. For example, the power supply 104 may be a "wired" power supply at a user's residence and/or a backup battery power supply when the wired power supply fails. In whatever form, the power management unit 103 is operable to detect a failure or low-power condition of the power supply 104 and shutdown certain functionality of the ONT 100. However, the ONT 100 is operable to remain at least partially functional by converting energy from the optical signal received from the optical link to electrical power in the event of the loss of power from the power supply 104. Alternatively or additionally, the ONT 100 can convert and accumulate received optical transmission power in a suitable power storage device (battery or ultracapacitor) to enable operation over brief periods of time, for instance to transmit relevant network information and status updates, on a one-time or periodic basis.

Figure 2:
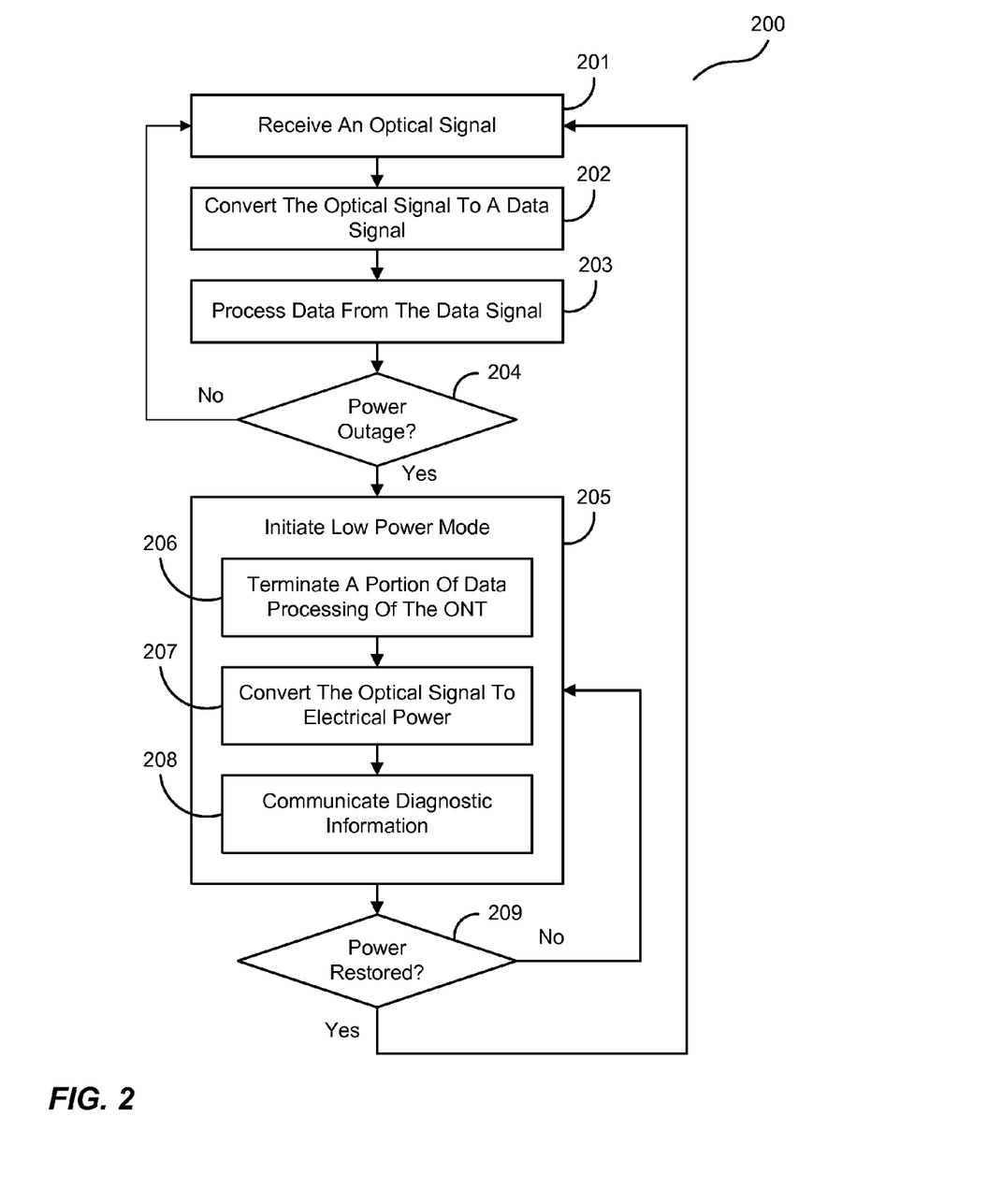
FIG. 2 is a flowchart of an exemplary process operable with the ONT of FIG. 1.

One exemplary operation 200 of the ONT 100 is now shown and described in the flowchart of FIG. 2. In this embodiment, the ONT 100 is operational as the power supply 104 is supplying electric power to the ONT 100. Accordingly, the opto-electrical converter 101 is receiving an optical signal, in the process element 201, and converting the optical signal to a data signal, in the process element 202. The data signal is processed by the data processing module 102 to consume the data thereof for use by the ONT 100, the UE 105, or combination thereof, in the process element 203.

In the process element 204, the power management unit 103 detects a power outage or at least a low-power condition from the power supply 104. For example, electrical power from an end user's residence may "blackout" or "brownout" which would generally cause the ONT 100 to cease functioning. Even assuming that the ONT 100 is backed up with a battery power supply, that battery power supply will generally drain over the course of hours unless power is restored. Either case will eventually cause the ONT 100 to fail. The power management unit 103 detects this power failure or low-power condition and initiates a low-power mode, in the process element 205. If no power failure or imminent power failure is detected by the power management unit 103, the ONT 100 continues processing the optical signal over the optical link 110.

When in the low-power mode, the power management unit 103 terminates a portion of the data processing of the ONT 100, in the process element 206. For example, the power management unit 103 may shutdown more power consumption intensive functionality, such as networking functionality, telephony functionality, video functionality, and the like. However, the power management unit 103 may keep a portion of the data processing module 102 operational so as to provide diagnostic and other status information during a power outage.

To maintain operation of a portion of the data processing module 102, the power management unit directs the opto-electrical converter 101 to convert the received optical signal from the optical link 110 to electrical power, in the process element 207. For example, the opto-electrical converter 101 may comprise a passive photoelectric cell that is operable to convert optical energy into electrical energy. While the amount of power from the optical signal may not be substantial enough to maintain operations of the ONT 100, that power may be operable to communicate the diagnostic information of the ONT 100, in the process element 208, as well as allow the power management unit 103 to function and determine when power is restored, in the process element 209. Thus, an optical signal received from the optical link essentially remote powers the ONT 100.

Alternatively or additionally, the power management unit 103 may harvest power from the optical signal being received over the optical link 110 by the opto-electrical converter 101 and store that power in a battery (e.g., a "button cell" on the circuit board of the ONT 100, an ultracapacitor, an external backup battery, etc.). As that power is harvested and stored in the battery, the power management unit 103 may be operable to restore portions of the data processing module 102 overtime or intermittently. For example, once enough power has been stored in a battery, the power management unit 103 may be operable to initiate transmit functionality of the data processing module 102 for intermittent emergency signaling.

Although shown and described as an optical network terminal, or "ONT", the term ONT is intended to encompass a variety of optical units. For example, the ONT 100 may be representative of an optical network unit or "ONU" in a Fiber-to-the-X (FTTX, where "X" refers to the home "H", business "B", node "N", etc.) or a passive optical network (PON). In such networks, an operator could communicate through the optical link 110 to the ONT 100 to query the ONT for status information either on demand or at regular intervals as such information may be stored in nonvolatile memory on the ONT 100. The operators could then use the information to diagnose and resolve certain network issues.

Figure 3:
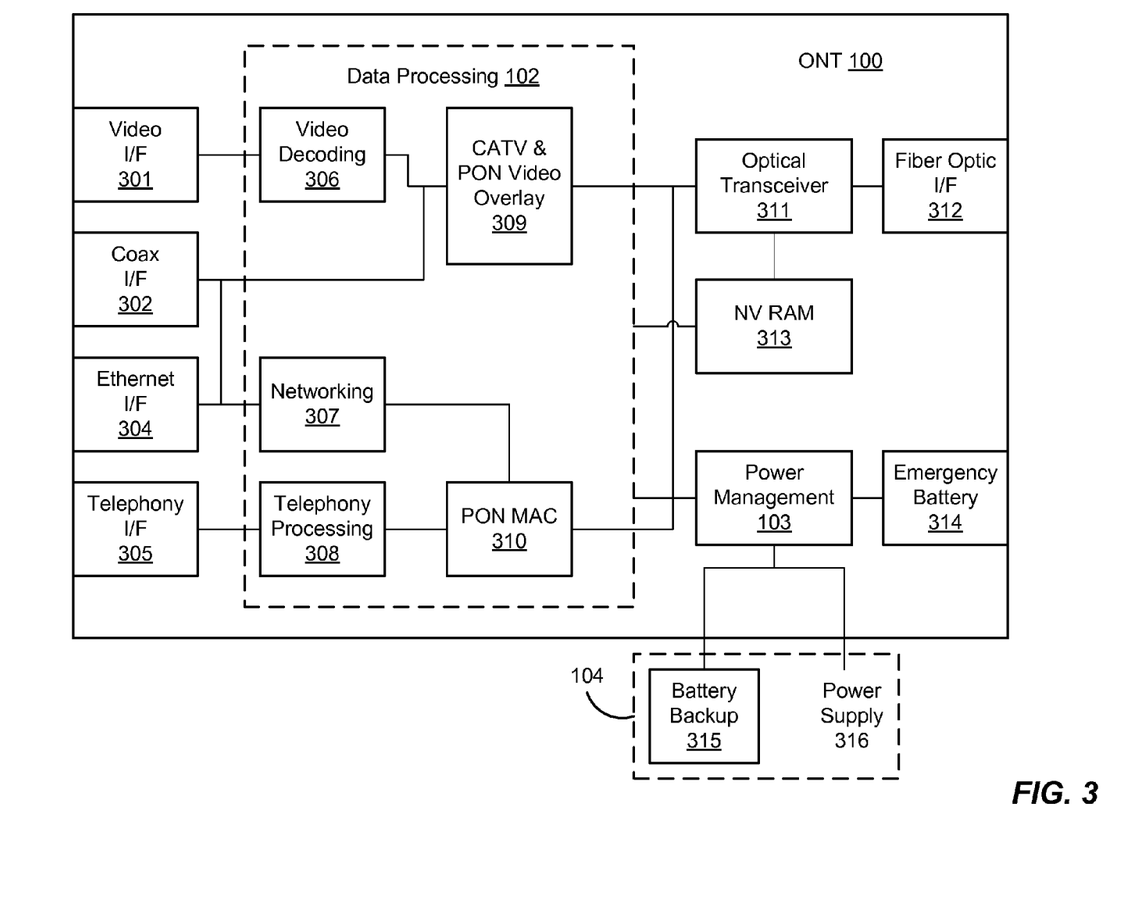
FIG. 3 is a more detailed block diagram of an exemplary ONT.

FIG. 3 is a more detailed block diagram of the exemplary ONT 100. In this embodiment, the ONT 100 may be operable as part of a communication hub for a residence. In this regard, the residence may consume various forms of communications including video, Ethernet, cable television, telephony and the like. Accordingly, the ONT 100 is configured with various interfaces such as a video interface 301, a coaxial interface 302 (e.g. for cable television), and Ethernet interface 304 (e.g., for device networking), and a telephony interface 305. Additionally, the ONT 100 is configured with a fiber optic interface 312 and an optical transceiver 311. The fiber optic interface 312 is operable to receive an optical signal (e.g., from the optical link 110) and/or transmit an optical signal (through the optical link 110). The optical transceiver 311 is operable to convert a data signal to an optical signal for data transmission, and vice versa for data reception.

During operation, the ONT 100 may routinely store network and status information on the ONT 100 and a nonvolatile memory, such as the NV RAM device 313. When power fails or substantially decreases from the power supply 104 (a main power supply 316 and/or a battery backup power supply 315), the power management unit 103 may make this information accessible to an operator or even an end-user (e.g. via the UE 105). To do so, the power management unit 103 shuts down the more power-consuming components of the ONT 100 such as the video decoding module 306, networking module 307, and telephony processing module 308. Other components associated with these functionalities that may be shutdown are the cable television (CATV) and PON video overlay modules 309 and the PON media access control (MAC). Thus, the interfaces associated with these functionalities may also be shut down so as to conserve power.

Generally, the power from the fiber-optic signal being received through the fiber-optic interface 312 is substantially less than the power from the power supply 104. Accordingly, the power management unit 103 may direct the electrical power converted from the optical power of the optical signal to an emergency battery backup 314 for more sustainable data transmissions when necessary. For example, to transmit an optical signal through the fiber-optic interface 312, the optical transceiver 311 may require a considerable amount of electrical power to drive the laser. The power derived from a received optical signal is generally not powerful enough to directly convert that to enough electrical power to drive a laser and transmit an optical signal. Accordingly, the power management unit 103 may store a portion of the derived electrical energy in an emergency battery 304. The power management unit 103 may even "burst" information as needed so as to further conserve power from the emergency battery 314 and not entirely drain the emergency battery 314.

While certain components on the ONT 100 are shown and described in this embodiment, it should be noted that this embodiment is merely exemplary in nature and that more or fewer components may exist with the ONT 100. Again, the majority of the components on the ONT 100, including the data processing module 102 and the power management unit 103, are operable via a processor configured on a printed circuit board of the ONT 100. Thus, a large portion of the functionality of the processor on the ONT 100 is shut down in the low power mode.

It should also be noted that the ONT 100 may be operable to receive and/or transmit multiple optical signals. For example, fiber-optic interface 312 may be operable to receive a single fiber-optic link with a single wavelength optical signal that can be converted to electrical power for use by the power management unit 103 to maintain certain functionality within the ONT 100 during the low power mode. Alternatively, the fiber-optic interface 312 may be operable to receive multiple fiber optic links, each with a single wavelength optical signal. Or, the fiber-optic interface 312 may be operable to receive multiple wavelengths of optical energy across a fiber-optic link. Whatever the circumstance, the power management unit 103 is operable to harvest the optical energy and convert that optical energy from the received optical signal to electrical energy to maintain power for certain functionality of the ONT 100 during the low power mode.

Figure 4:
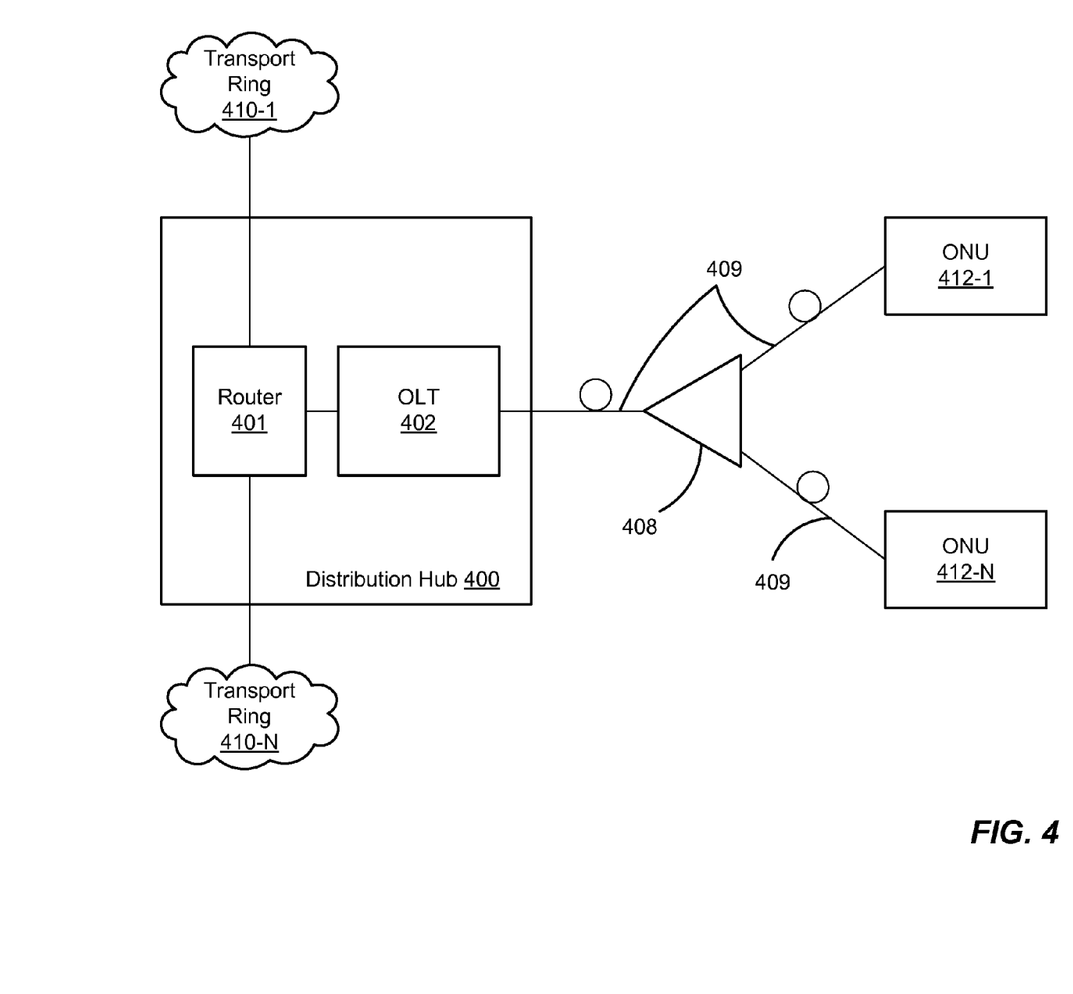
FIG. 4 is a block diagram of an exemplary optical distribution network.

FIG. 4 is a block diagram of an exemplary optical distribution network (ODN). In this embodiment, one or more optical modules may suffer a power outage or a low-power condition and be required to operate in a low-power mode as described hereinabove. For example, a data distribution hub 400 may comprise a router 401 that is connected to transport rings 410-1-410-N (wherein the reference "N" merely represents an integer greater than "1" and not necessarily equal to any other "N" reference designated herein) for the purposes of data networking with other networks and devices. The data distribution hub 400 may include an optical line terminal (OLT) 402 that is optically connected to optical network units (ONUs) 412-1 412-N via the fiber optic links 409 and the optical splitter 408.

Any one of these devices, the OLT 402 and the ONUs 412 are susceptible to experiencing a loss of power or a shortage of power. Accordingly, any the embodiments disclosed herein may be configured with the OLT 402 and/or the ONUs 412 to manage power in a low-power mode so as to provide certain functionality to those devices, such as status information and networking information.

Figure 5:
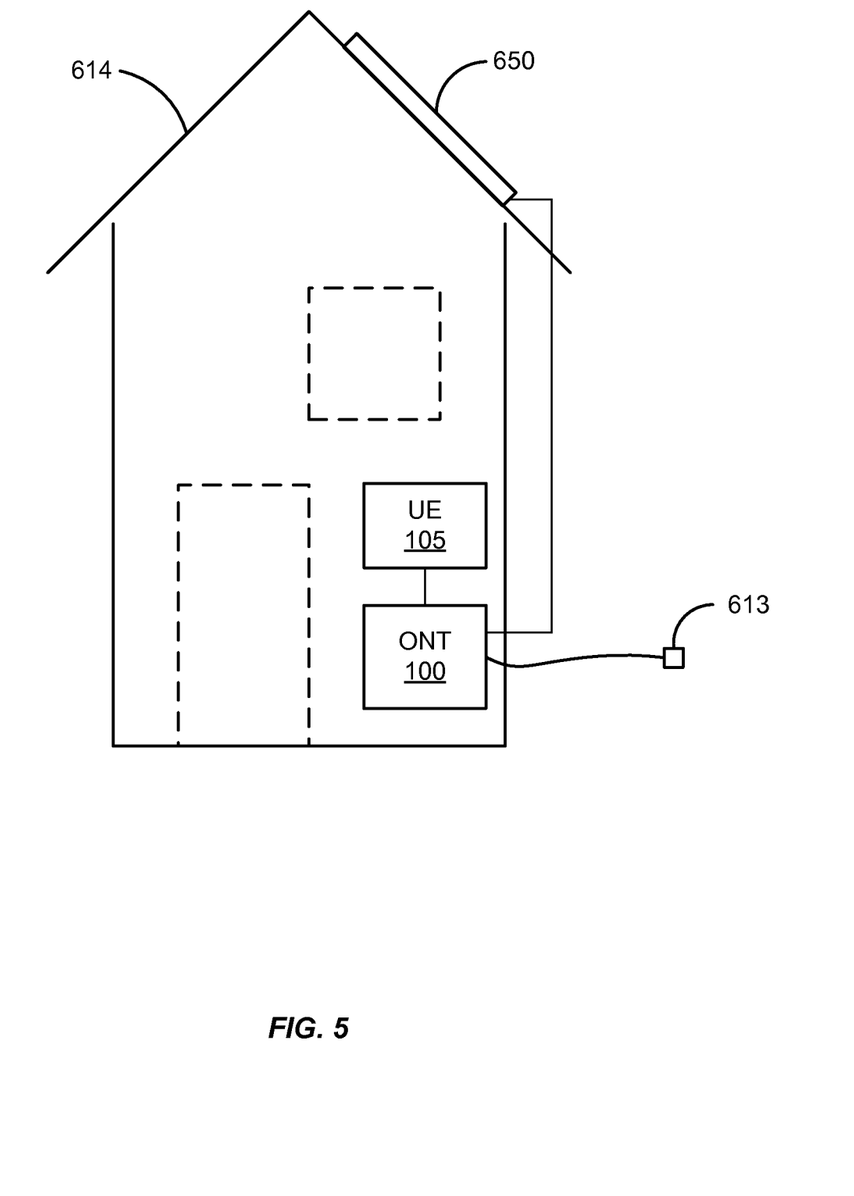
FIG. 5 is a block diagram of an exemplary power supply system for an optical component.

FIG. 5 is a block diagram of another exemplary power supply system for optical components. In this embodiment, the ONT 100 is configured in or on the subscriber's home 614 for business to supply data, telephony, video, and other services to the subscriber's UE 105. The ONT 100 is communicatively coupled to the taps 613 as shown and described above. Generally, the ONT 100 is configured to receive power from the power distribution network resident within the subscriber's home 614 or business. However, when that power fails, electrical power may be provided to the ONT 100 through a solar panel charging system 650 electrically coupled to the ONT 100. Such a system may be configured in a variety of ways as a matter of design choice. For example, a solar panel may be affixed to a roof of the subscriber's home 614 or business or directly attached to the ONT 100 itself In any case, if power fails or decreases to an extent that it is incapable of operating all of the components on the ONT 100, the power management unit 103 is operable to shut down certain functionality within the ONT 100 as described hereinabove.

In some embodiments, the power management unit 103 is further operable to determine how many modules it can operate in a low-power mode. For example, if enough power exists to supply power to the data processing module 102 and the optical transmitting/receiving functionality of the optical transceiver 311, the power management unit 103 may keep those modules operational while shutting down other functionality.

Alternatively or additionally, in some embodiments, the power management unit 103 can even monitor the power consumption by individual modules within the ONT 100 over time to determine its own best use of resource allocation. For example, assume that the power supply to the ONT 100 has decreased by 50%. Then assume that the telephony processing 308 generally consumes about 70% of the power to the ONT 100 and any given time. To ensure that the remaining functionality is operational, the power management unit 103 may shut down the telephony processing 308. Accordingly, the invention is not intended be limited to any particular embodiment shown and described herein. Rather, the inventive aspects shown and described herein may be implemented in a variety of ways as a matter of design choice.

Moreover, the inventive aspects shown and described herein may be implemented with a variety of communication systems. For example, some optical networking embodiments shown and described herein illustrate how the optical modules thereof (e.g., ONUs 412, ONTs 100 and OLTs 402) can operate in a low-power mode to provide certain functionality to those modules. However, invention is not intended be limited to merely optical networking. Rather, the power management techniques shown and described herein may be implemented in a variety of communication networks employing optical communications including telephony networks employing, for example, Long Term Evolution (LTE) protocols, 4th Generation (4G) protocols, 3rd Generation (2G) protocols, or the like.

Figure 6:
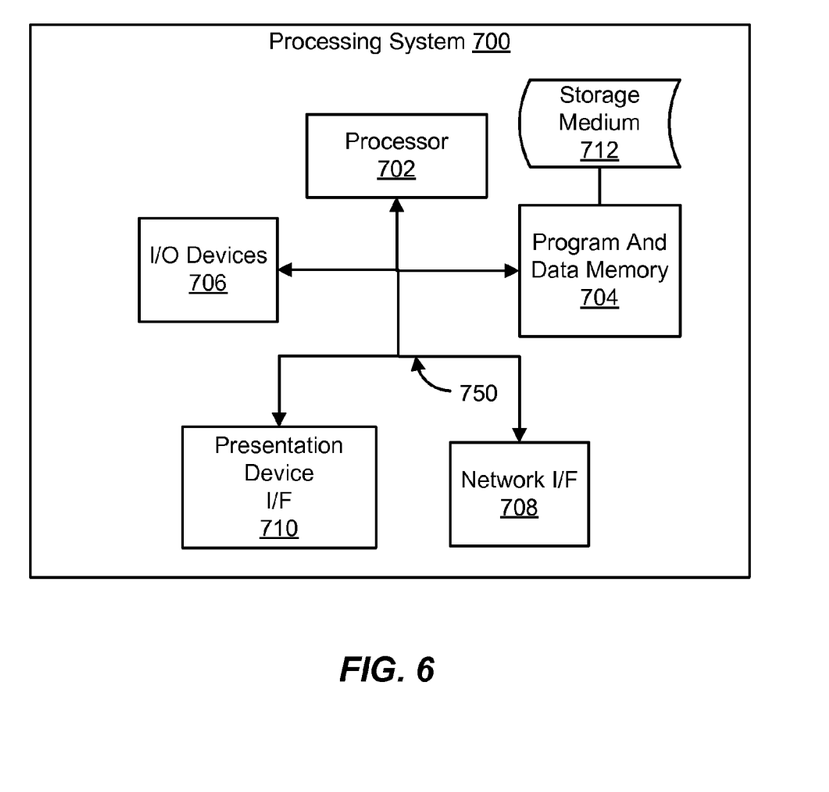
FIG. 6 is a block diagram of an exemplary processing system operable to implement at least portions of the embodiment herein.

FIG. 6 illustrates an exemplary processing system 700 that is operable to implement one or more of the embodiments hereinabove. For example, some of the embodiments of the invention can take the form of a computer program accessible via the computer-readable storage medium 712. The storage medium provides program code for use by a computer or any other instruction execution system. For the purposes of this description, computer readable storage medium 712 can be anything that can contain, store, communicate, or transport the program for use by a computer.

The computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

The processing system 700, being suitable for storing and/or executing the program code, includes at least one processor 702 coupled to memory elements 704 through a system bus 750. Memory elements 704 can include local memory employed during actual execution of the program code, bulk storage, and cache memories that provide temporary storage of at least some program code and/or data in order to reduce the number of times the code and/or data are retrieved from bulk storage during execution.

Input/output (I/O) devices 706 (including but not limited to keyboards, displays, pointing devices, etc.) can be coupled to the processing system 700 either directly or through intervening I/O controllers. Network adapter interfaces 708 may also be coupled to the system to enable the processing system 700 to become coupled to other processing systems or storage devices through intervening private or public networks. Modems, cable modems, IBM Channel attachments, SCSI, Fibre Channel, and Ethernet cards are just a few of the currently available types of network or host interface adapters. Presentation device interface 710 may be coupled to the system to interface to one or more presentation devices, such as printing systems and displays for presentation of presentation data generated by the processor 702.

While the invention has been illustrated and described in detail in the drawings and foregoing description, such illustration and description is to be considered as exemplary and not restrictive in character. Certain embodiments described hereinabove may be combinable with other described embodiments and/or arranged in other ways. Accordingly, it should be understood that only a preferred embodiment and variants thereof have been shown and described and that all changes and modifications that come within the spirit of the invention are desired to be protected.

What is claimed is:

1. An optical network terminal (ONT), comprising:
   an opto-electrical converter operable to receive an optical signal and to convert the optical signal to a data signal;
   a data processing module operable to process data from the data signal; and
   a power management unit operable to detect a power outage of a power supply, to initiate a low power mode, to terminate a portion of data processing by the data processing module based on the low power mode, to convert the optical signal to electrical power, and to maintain operation of the low power mode utilizing the electrical power,
   wherein the power management unit is further operable to monitor the power supply for restoration of power, and to reinitialize the data processing module upon said restoration of power.

2. The ONT of claim 1, wherein:
   the power supply is a battery backup power supply.

3. The ONT of claim 1, wherein the power management unit is further operable to charge the battery backup power supply using the optical signal, another optical signal, or a combination thereof.

4. The ONT of claim 1, wherein:
   the data processing module is further operable, in the low power mode, to transfer network diagnostic information to another ONT during the power outage.

5. The ONT of claim 4, wherein:
   the diagnostic information is operable to identify operating characteristics of the ONT prior to or during the power outage.

6. The ONT of claim 4, wherein:
   the other ONT is a module of a telecommunication system; and
   the ONT is further operable to communicate with the other ONT through a protocol comprising:
   Long Term Evolution (LTE) protocol;
   $4^{th}$ Generation (4G) protocol;
   $3^{rd}$ Generation (2G) protocol; or
   a combination thereof.

7. The ONT of claim 1, wherein:
   the power supply is an ultracapacitor.

8. The ONT of claim 1, wherein:
   the ONT is a Fiber-To-The-X ONT.

9. A method operable in an optical network terminal (ONT), the method comprising:
   receiving an optical signal;
   converting the optical signal to a data signal;
   processing data from the data signal;
   detecting a power outage of a power supply;
   initiating a low power mode;
   in response to initiating the lower power mode:
   terminating a portion of data processing of the ONT;
   converting the optical signal to electrical power; and
   maintaining operation of the low power mode utilizing the electrical power.

10. The method of claim 9, further comprising:
    monitoring the power supply in the low power mode for restoration of power; and
    reinitializing data processing module upon said restoration of power.

11. The method of claim 9, wherein:
    the power supply is a battery backup power supply; and
    the method further comprises charging the battery backup power supply using the optical signal, another optical signal, or a combination thereof.

12. The method of claim 9, further comprising:
    transferring, in the low power mode, network diagnostic information to another ONT during the power outage, wherein the diagnostic information is operable to identify operating characteristics of the ONT prior to the power outage.

13. The method of claim 12, wherein:
    the other ONT is a module of a telecommunication system; and the method further comprises communicating with the other ONT through a protocol comprising:
    Long Term Evolution (LTE) protocol;
    $4^{th}$ Generation (4G) protocol;
    $3^{rd}$ Generation (2G) protocol; or
    a combination thereof.

14. The method of claim 9, wherein:
    the power supply is an ultracapacitor.

15. A non-transitory computer readable medium comprising instructions that, when executed by a processor in an optical network terminal (ONT), direct the processor to:

receive an optical signal;
convert the optical signal to a data signal;
process data from the data signal;
detect a power outage of a power supply;
initiate a low power mode;
in response to initiating the lower power mode:
terminate a portion of data processing of the ONT;
convert the optical signal to electrical power; and
maintain operation of the low power mode utilizing the electrical power.

16. The computer readable medium of claim 15, further comprising instructions that direct the processor to:
monitor the power supply in the low power mode for restoration of power; and
reinitialize data processing module upon said restoration of power.

17. The computer readable medium of claim 15, wherein:
the power supply is a battery backup power supply; and
the instructions further direct the processor to charge the battery backup power supply using the optical signal, another optical signal, or a combination thereof.

18. The computer readable medium of claim 15, further comprising instructions that direct the processor to:
transfer, in the low power mode, network diagnostic information to another ONT during the power outage,
wherein the diagnostic information is operable to identify operating characteristics of the ONT prior to the power outage.

19. The computer readable medium of claim 18, wherein:
the other ONT is a module of a telecommunication system; and
the instructions further direct the processor to communicate with the other ONT through a protocol comprising:
Long Term Evolution (LTE) protocol;
$4^{th}$ Generation (4G) protocol;
$3^{rd}$ Generation (2G) protocol; or
a combination thereof.

20. The computer readable medium of claim 15, wherein:
the power supply is an ultracapacitor.

* * * * *